United States Patent [19]

Kuo et al.

[11] Patent Number: 4,977,397

[45] Date of Patent: Dec. 11, 1990

[54] TOUCH-CONTROL COMPUTER HOUSE

[75] Inventors: Wen-Chieh Kuo, Hsin Chu; Chia-Hui Lin, Taipei; Te-Chang Chou, Hsin Tien; Yuan-Hsiung Liang, Taipei, all of Taiwan

[73] Assignee: Sysgration Ltd., Taiwan, Taiwan

[21] Appl. No.: 427,681

[22] Filed: Oct. 13, 1989

[51] Int. Cl.$^5$ .............................................. G09G 3/02
[52] U.S. Cl. .................................... 340/710; 178/18; 338/128
[58] Field of Search ............... 340/710, 712, 706, 709; 178/18; 338/128; 341/34

[56] References Cited

U.S. PATENT DOCUMENTS 4,550,221  10/1985  Mabusth ............................. 340/712
4,587,378  5/1986   Moore ................................. 178/18
4,639,720  1/1987   Rympalski et al. ................ 340/712

Primary Examiner—Alvin E. Oberley
Assistant Examiner—Xiao Wo
Attorney, Agent, or Firm—Wenderoth, Lind & Ponack

[57] ABSTRACT

A touch-control mouse provides rapid and accurate control of the positioning of a cursor on a computer display screen, and includes a laminated touch-control film assembly, an aluminum supporting board, a press button switch set, a signal processing circuit board, and a dust-protective hanging case. Drawing using a finger on x-axis and y-axis resistance planes of the laminated touch-control film assembly results in variable potential value for x, y coordinates. The value of potential variation is calculated through a single-chip microprocessor to indicate relative direction, speed and amount of displacement on x, y coordinates. The signal of the relative direction, speed and amount of displacement is further is further sent by the single-chip microprocessor through a standard RS-232 connector to one of the serial communications ports of a PC to rapidly and accurately control the positioning of the cursor on the computer display screen.

7 Claims, 5 Drawing Sheets

TOUCH-CONTROL COMPUTER HOUSE

BACKGROUND OF THE INVENTION

The present invention relates to a computer mouse, and more particularly, to a touch-control computer mouse which can rapidly and accurately control the positioning of a cursor on a computer display screen.

Conventionally, the positioning of a cursor on a computer display screen may be controlled by a variety of input devices, such as a computer mouse, joystick, keyboard, trackball and digitizer. Drawbacks of these various input devices are discussed below:

1. Computer mouse: The optical and mechanical mouse, each use a rotary ball to carry an x, y rotary axis and rotary encoder so as to obtain corresponding coordinates. This kind of input device must be operated on a plain surface. Therefore, it is not practical for use in a portable PC, in a transportation vehicle or a narrow space. Further, the computer mouse regularly tends to be contaminated with dust or impurities during contact, causing erroneous action or jamming.

2. Joystick: The joystick utilizes a variable resistance and a universal control lever to control horizontal and vertical displacement to further produce a variable potential signal. For use of a joystick, a game control interface must be equipped. Further, joystick input control is power consuming because the electric contact pole of the universal control lever is constantly in contact with the variable resistance. More particularly, joystick input control is not convenient for signal input on a displacement of a long distance.

3. Keyboard: The keyboard is heavy, large and not convenient for graphic input.

4. Trackball: The trackball is similar to computer mouse. However, the rotary ball of a track ball is disposed upward and is relatively bigger, and must be displaced by one or two fingers so as to allocate the positioning of a cursor. Therefore, the operation of a trackball is more inconvenient and tends to cause muscle problems.

5. Digitizer: The Digitizer is not convenient to operate since it requires a magnetic field exciter and an additional power supply.

SUMMARY OF THE INVENTION

It is therefore the main object of the present invention to provide such a touch-control computer mouse which is easy to operate and convenient for carriage.

Another object of the present invention is to provide such a touch-control computer mouse which includes a laminated touch-control film assembly to convert a finger touch signal to a telecommunication signal for the vertical and horizontal coordinates of a computer monitor.

A yet further object of the present invention is to provide such a touch-control computer mouse which is protected in a dust-protective case and may be detachably attached to a PC or communicating equipment by means of a fastening element for convenient operation in a transportation vehicle or narrow space.

According to the present invention, a touch-control computer mouse is comprised of a laminated touch-control film assembly, an aluminum supporting board, a press button switch set, a signal processing circuit board, and a dust-protective hanging case. Drawing using a finger on x-axis and y-axis resistance planes of the laminated touch-control film assembly results in variable potential value for x, y coordinates. The value of potential variation is calculated through a single-chip microprocessor to indicate relative direction, speed and amount of displacement on x, y coordinates. The signal of the relative direction, speed and amount of displacement is further sent by the single-chip microprocessor through a standard RS-232 output to a computer main unit to rapidly and accurately control the positioning of the cursor on the computer display screen.

DETAILED DESCRIPTION OF THE PREFERRED EMBODIMENT

Figure 1:
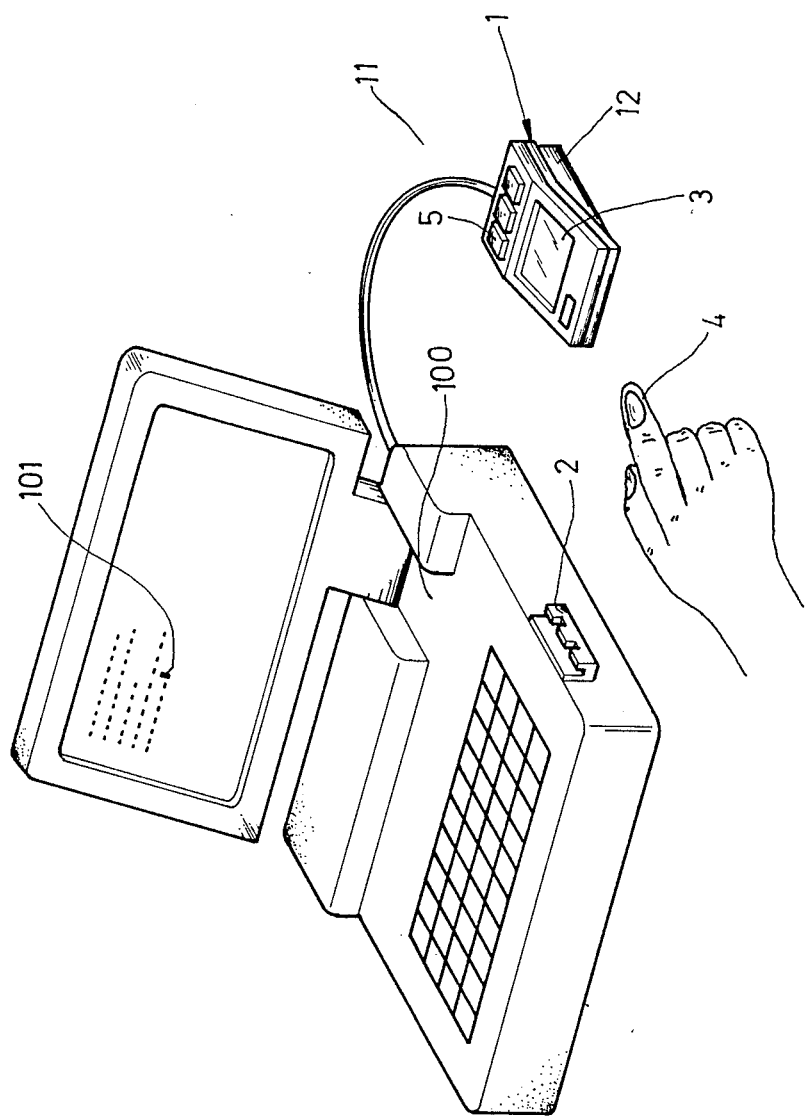
FIG. 1 is a schematic drawing in which a touch-control computer mouse which is constructed according to the present invention is connected to portable PC for cursor control.

FIG. 1 is a schematic drawing of the present invention, in which a touch-control computer mouse (1) of the present invention is plugged into one of the serial communications ports of a portable personal computer (100) via an electric cable (11), and a fastening means (2) is attached to the housing of the computer at one lateral side onto which the casing (12) of the touch-control computer mouse (1) may hang. Through finger (4) contact on the touch-control space (3), the cursor (101) on the screen of the computer (100) is immediately moved to a desired location. After function mode selection is properly made through a press button control switch set (5), data input can then be made through the keyboard of the computer (100).

Figure 2:
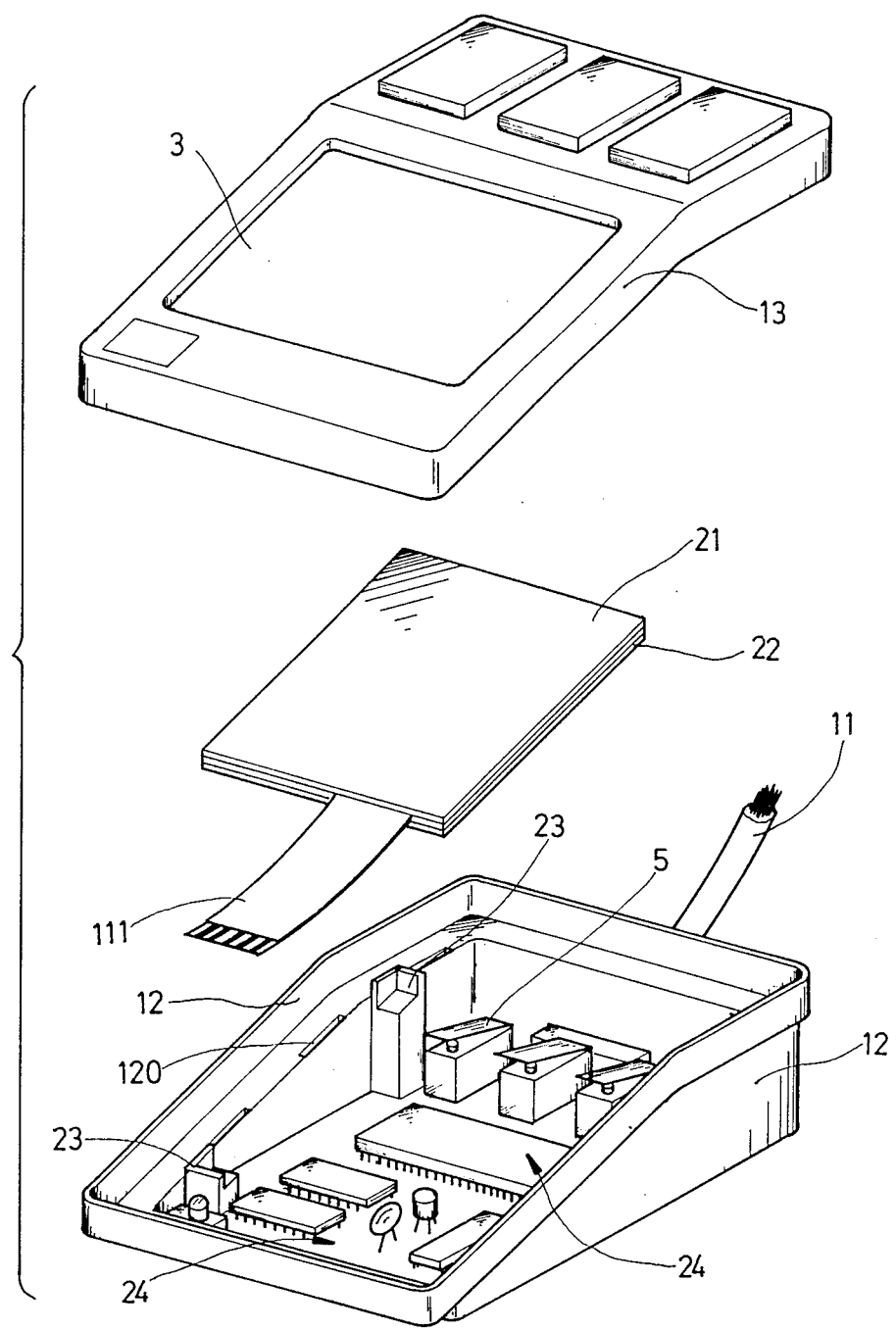
FIG. 2 is a fragmentary structural view of the present invention.

FIG. 2 is a perspective fragmentary view of a touch-control computer mouse embodying the present invention. As illustrated, a touch-control computer mouse of the present invention is generally comprised of an upper cover (13) defining therein a touch-control space (3), a casing (12), a laminated touch-control film assembly (21), an aluminum supporting board (22), a plurality of supporting stands (23), a signal processing circuit board (24), a press button control switch set (5) for function selection, and an electric cable (11). The signal processing circuit board (24) is internally mounted on the casing (12) in the front region; the press button control switch set (5) for function selection is fixedly set in the back region, the supporting stands (23) are fixedly set around the side-wall; the aluminum supporting board (22) is fixedly mounted on the supporting stands (23) at the top through adhesive connection; the laminated touch-control film assembly (21) is mounted on the aluminum supporting board (22) at the top with its flexible ribbon line (111) connected to the signal processing circuit board (24); and the upper cover (13) is secured to the casing (12) at the top to cover the said component parts therein with the laminated touch-control film assembly (21) disposed in the touch-control space (3).

The casing (12) of the present invention comprises several slots (120) made at one lateral side-wall through which the casing (12) may be hung on the fastening element (2) of a computer (100) (see FIG. 1).

Figure 3A:
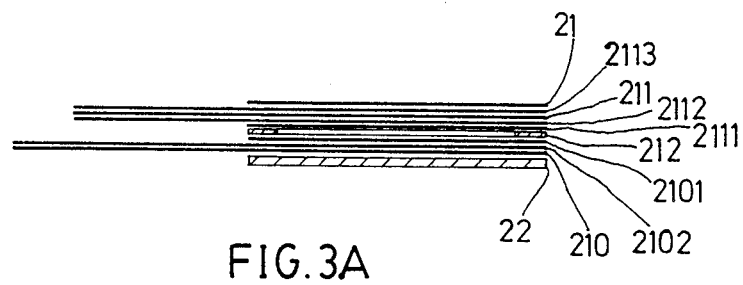
FIG. 3A is a side sectional view of the laminated touch-control film assembly of the present invention.

FIG. 3A is a sectional view of the laminated touch-control film assembly of the present invention. The laminated touch-control film assembly is comprised, from the top to the bottom in proper sequence, of a plastic film face panel (21), a plane of silver coating (2113), a mylar film layer (211), silver glue conductors (2112), a y-axis resistance plane (2111), a division layer (212), a x-axis resistance plane (2101), silver glue conductors (2102), a mylar film layer (210), and the aluminum supporting board (22). The plane of silver coating (2113) isolates any static electicity or noise resulting from the touching of the finger at the face panel (21). The silver glue conductors (2112) are to derive a reference potential from the y-axis (vertical axis) resistance plane (2111). The division layer (212) is a hollow rectangular frame, to isolate the x-axis resistance plane (2101) and the y-axis resistance plane (2111) from each other and to let the x-axis resistance plane (2101) and the y-axis resistance plane 2111 be connected only when the laminated touch-control film assembly is touched and pressed by a finger or something else. The x-axis (horizontal) resistance plane is to provide a reference potential through the silver glue conductors (2102). The mylar film layers (211) and (210) are for adherence thereto of the component layers respectively. The aluminum supporting board (22) is to firmly support the flexible, light and soft laminated touch-control film assembly against pressing of a finger.

Figure 3B:
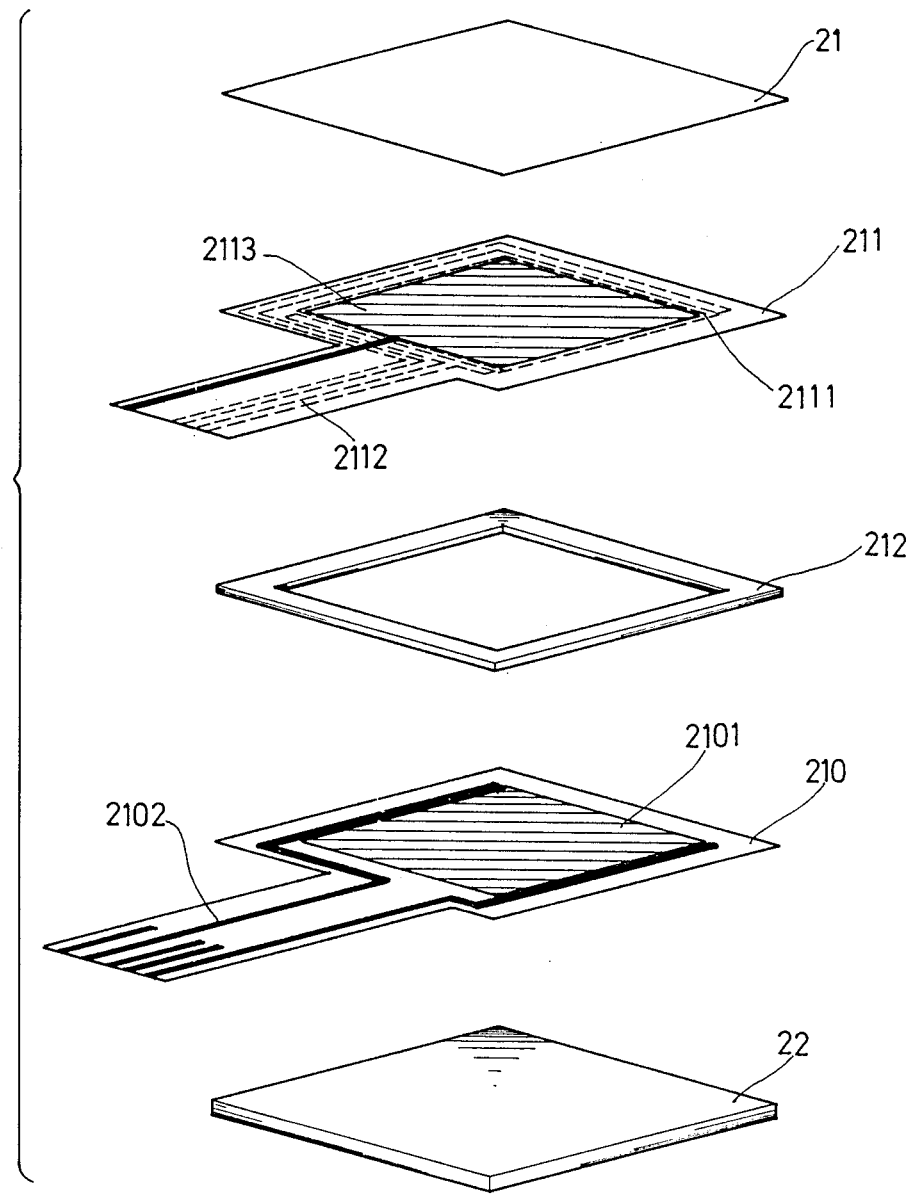
FIG. 3B is an exploded view illustrating the composition of the respective layer of the laminated touch-control film assembly of the present invention.

For a better understanding of the structure of the laminated touch-control film assembly of the present invention, please refer to FIG. 3B. As illustrated, the top layer of a laminated touch-control film assembly of the present invention is a plastic film face panel (21); a plane of silver coating (2113) is made on a mylar film layer (211) with a silver glue conductor (the real line at the left) extending therefrom for grounding and noise eliminating; a y-axis resistance plane (2111) is set below (at the back of) the mylar film layer (211) (as illustrated by the dotted line); a silver glue conductor (2112) (in dotted line) is extending from the y-axis resistance plane (2111) at the back side to derive a reference potential from the y-axis (vertical axis) resistance plane (2111); a x-axis (horizontal axis) resistance plane (2101) is mounted on another mylar film layer (210) at the top with two silver glue conductors (2102) extending therefrom for deriving a reference potential; a division layer (212) is set in the middle between the y-axis resistance plane (2111) and the x-axis resistance plane (2101); and an aluminum supporting board (22) is set at the bottom. The division layer (212) is to isolate the x-, y-axis resistance planes from each other when the laminated touch-control film assembly (21) is not touched. The above structural layers are connected together through a heat pressing process to form into a laminated unitary film assembly (21) with a flexible ribbon line, which is comprised of four reference potential output conductors for the x-axis and y-axis and one conductor from the plane of silver coating (2113) for grounding, extending therefrom for connection to the signal circuit processing circuit board (24).

Figure 4:
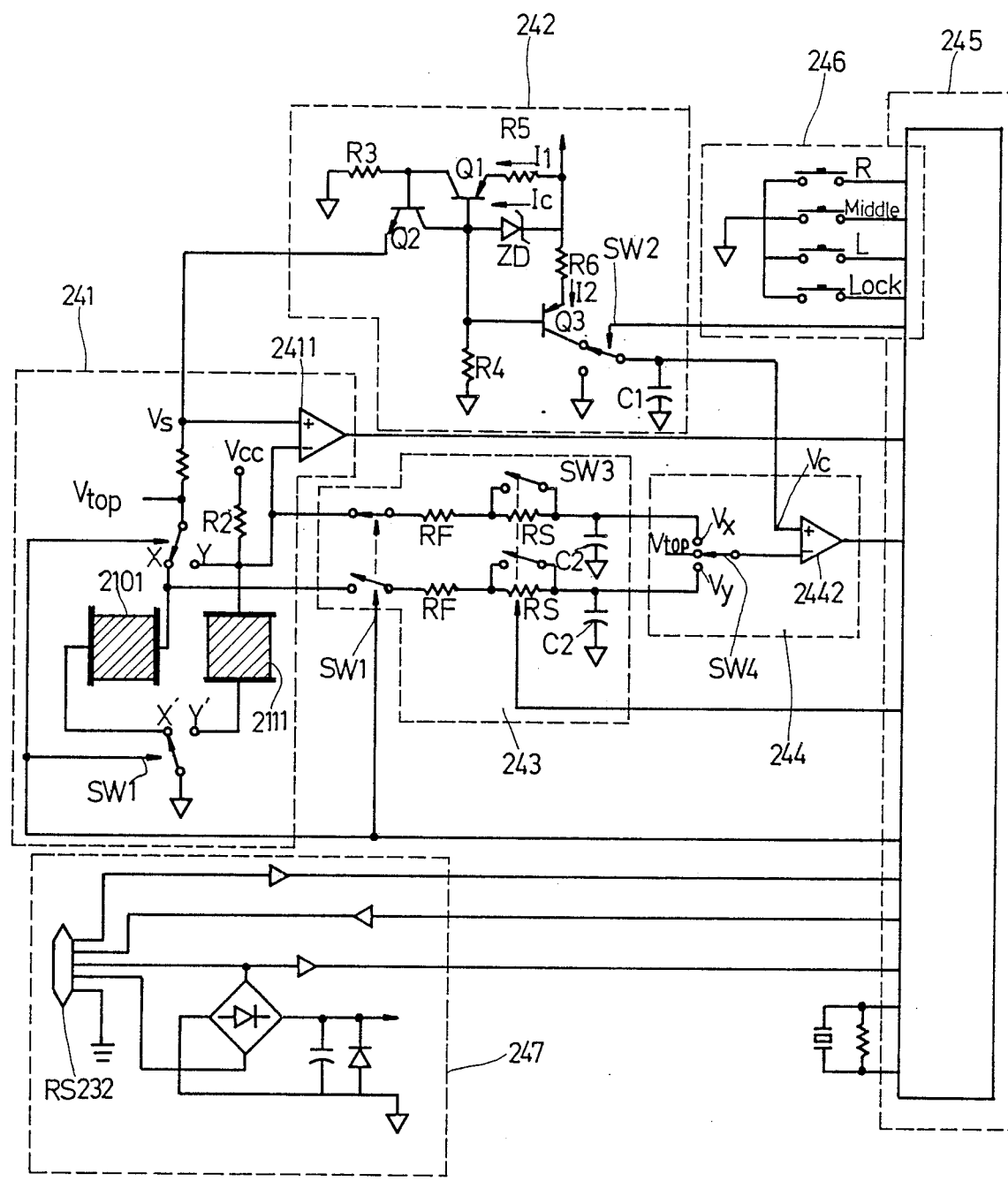
FIG. 4 is a circuit diagram of the present invention.

FIG. 4 is a circuit diagram of the present invention, in which the contact position detector (241) serves as a sensing circuit to detect the touching of a finger at the x-axis and y-axis resistance planes (2101) and (2111) so as to provide the single-chip microprocessor (245) with corresponding signal regarding touching or releasing of finger and to help the single-chip mocroprocessor (245) eliminate bounce and control a high-low speed averager (243). The operation of the contact position detector (241) is outlined hereinafter:

When SW1 is pressed to touch at a position x, x', a VTOP to 0 potential is uniformly distributed over the x plain resistance (2101). Under this condition, the y plain resistance (2111) serves as a contact pole to obtain a potential of the contact point at the x plain resistance (2101) so as to read the potential at x-axis from y or y'. Because there is a linear relation between the location and the potential, the location at x-axis can thus be obtained. On the other hand, when SW1 is pressed to touch at a position in y, y', the x plain resistance (2101) serves as a contact pole so as to obtain the location at the y-axis.

According to the foregoing statement, a floating problem may arise from x, y resistance planes when x, y resistance planes are not in contact with each other, and the MPU single-chip microprocessor (245) may erroneously read the data. In order to solve this floating problem, a push high resistor R2 which has a resistance value higher than the plain resistance is mounted on the contact detector (241) at x, x' or y, y'. Therefore, potential reading can be accurately made when one is using one's finger to draw on the laminated unitary film assembly (21) the x, y plain resistance are forced to contact with each other. Because the read out value at any location is smaller than or equal to VTOP and VS is larger than VTOP, the output from the comparator (2411) becomes "1".

When x, y plain resistance (2101) and (2111) are not in contact with each other, the potential at y of the reading value of the contact pole is VCC and higher than VS, because of the operation of R2 and the output of the comparator (2411) becomes "0". Therefore, it can be determined through the output from the comparator (2411) whether the laminated unitary film assembly is touched.

Referring to the circuit diagram of the present invention as illustrated in FIG. 4, a power-saving type constant voltage and ramp generator (242) is used. Because regular IC requires relatively higher working voltage and consumes relatively more power, it is not practical for use in the present touch-control computer mouse. Therefore, a power-saving type constant voltage and ramp generator (242) must be used. The operation of the power-saving type constant voltage and ramp generator (242) of the present invention is discussed below:

A starting resistance R4 provides a bias current with a Zener diode ZD to produce a voltage VZD. The voltage VZD thus obtained is sent to the base of Q1 and Q3 to produce constant current I1 and I2, in which I1=(VZD−0.6V)/R5, I2 =(VZD−0.6V)/R6 (0.6V is a positive voltage). I1 of the transistor Q1 flows through R3 to produce a voltage of I1 R3. The current through the emitter of Q2 then establishes a voltage VS to the load of the x, y resistance planes (2101) and (2111), of which the load current Ic runs further through the Zener diode ZD to provide a VZD voltage. Because of the nature of semiconductor, when load current I1 becomes constant, VZD becomes constant too, and when VZD becomes constant at both ends of the Zener diode ZD, load current I1 becomes a constant value too. The process is repeated again and again to stabilize the VS voltage. The current I1 for the load (x, y plain resistance) is simultaneously provided for the Zener diode ZD to become fully utilized. Because a relatively higher resistance value is adopted, the characteristics of the circuit of the present invention will not be affected by the starting resistance R4. However, if the starting resistance R4 is not used, the circuit will be unable to start (i.e. Q1, Q2, Q3 become a broken circuit).

Further, I2 (the current through Q3) is for generating a ramp. Because I2 is a constant current, the voltage at the capacitor C1 becomes VC=Q/C=(I.T)/C when the capacitor C1 is charged, and I2 (the current from Q3 toward the capacitor C1) is fully utilized for charging the capacitor C1. In the circuit, the SW2 is to control the discharging of the capacitor C1.

The high-low speed averager (243) is used in the contact position detector (241) to stabilize the contact signal for accurate determination by the single-chip microprocessor (245). Because a human finger is served as an input interface in the touch-control computer mouse (1) of the present invention, the potential at the contact point may vary with pressure change or shaking of the hand to produce noise current. Therefore, RC averager circuit is utilized to eliminate noise and stabilize the output. Referring to the high-low speed averager (243) of FIG. 4, RF is high-speed average resistance, RS is low-speed average resistance, C2 is average capacitor, SW3 is high-low speed averager control switch, SW1 is x, y axis communication mode selection switch. Because circuit reaction speed is slower at the front stage of a contact signal, a high-speed averager is used for the front segment of a contact signal wave form and a low-speed averager is used for the end segment of the contact signal wave form to allow to the contact signal wave form be well filtrated for further accurate determination by the single-chip microprocessor.

The voltage reader (244) utilizes the timer and the selector switch SW4 of the single-chip microprocessor (245), the voltage of the VTOP and the ramp generator of the constant voltage circuit and ramp generator (242) to read the corresponding voltage value of the contact position detector (241) at x-axis, y-axis average resistance (2101), (2111). The operation is outlined hereinafter. SW4 is to act at VTOP and SW2 is grounded to allow the capacitor C1 discharge to zero potential to in turn allow the timer of the single-chip microprocessor (245) be reset. Then the timer of the single-chip microprocessor is started, the SW2 switches on the collector of the transistor Q3 to allow a constant current run to charge the capacitor C1. As soon as voltage VC≧VTOP, the output of the comparator (2442) becomes "1". The timer of the single-chip microprocessor (245) is stopped immediately, and the total count of the timer becomes Ttop. In the same manner, when SW4 is switched to the contact potential VX of the x-axis or the contact potential VY of the y-axis after wave form filtration, the value for TX and TY can also be obtained. From the value of Ttop, TX and TY, the position of contact points Xt1, Yt1, Xt2, Yt2, . . . can thus be obtained; from the value of Xt2-Xt1, Yt2-Yt1, the direction and amount of the shifting of contact point can be determined; and Xt1=Tx1/Ttop, Yt1=TY1/Ttop . . . Xtn=Txn/Ttop, Ytn=Tyn/Ttop.

In the present invention, the above-described circuit is used to match with a single-chip microprocessor (245), a function selector switch (246) and one series of input-output and power circuit (247). Therefore, in addition to the function that a regular computer mouse provides, a lock key may be further used to draw lines directly through the face panel of the present invention. Because no additional power cable is required, power saving and dust protective requirements can be efficiently achieved.

Figure 5:
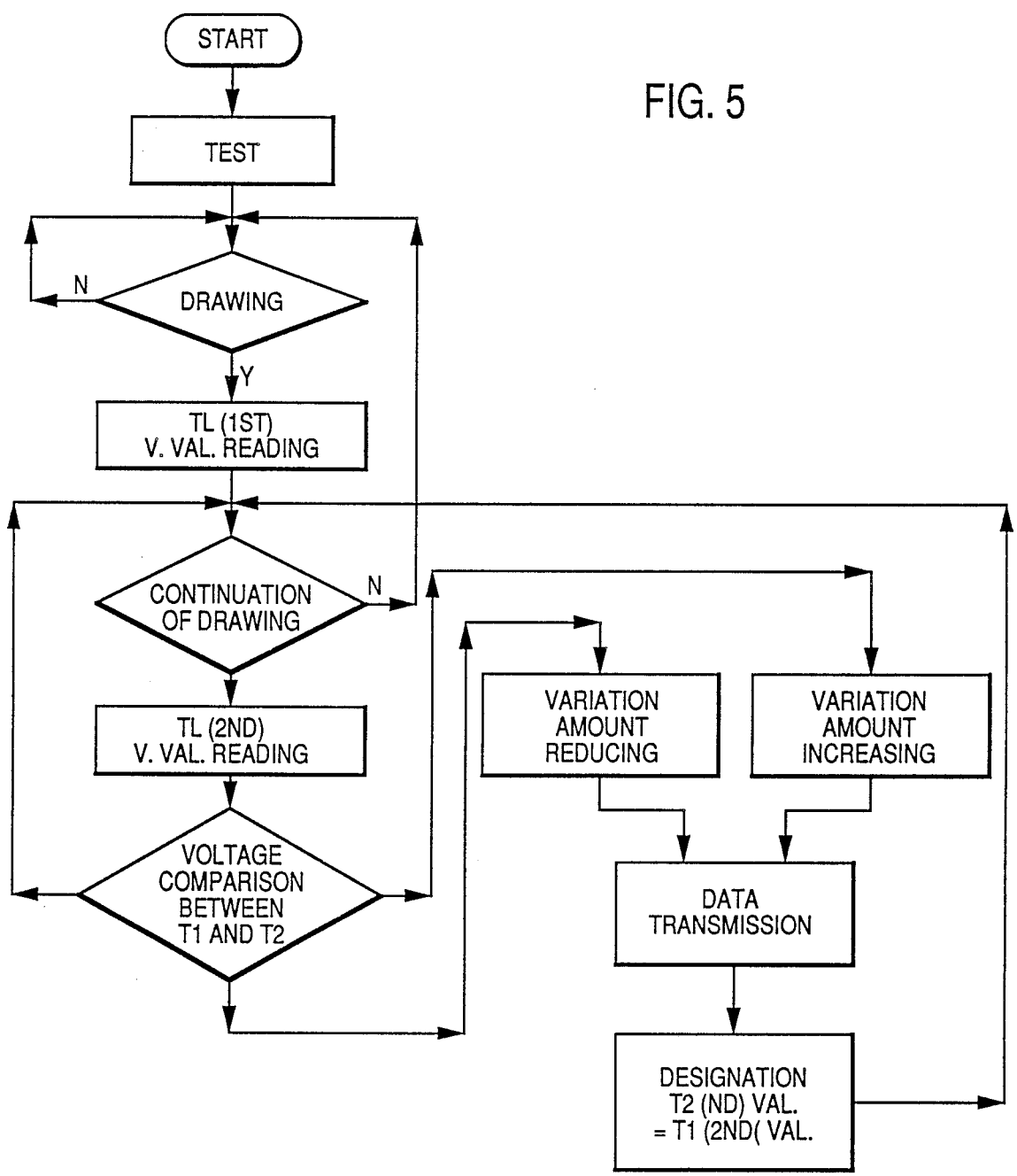
FIG. 5 is a flow chart illustrating the operation of the touch-control signal processing.

Reference is made to the flow chart of FIG. 5 which illustrates the operational process of the present invention. When the present invention is connected to a PC or communication equipment, signal processing circuit checks if the finger drawing process starts. It continues to check the signal if the answer is negative. If the answer is positive, it reads the voltage value of t1 (first touch) and then checks if further finger drawing is still continuously performing. If the answer is negative, it jumps back to start. If the answer is positive, it starts to read the voltage value of t2 (finger touch at the second time) and compare the voltage value of t2 with t1. If the value of t2 is equal to the t1, it returns to the start to check the finger touch signal. If the voltage value of t1 (the first) is smaller than t2 (the second), the amount of variation is reducing; if the voltage value of t2 (the second) is smaller than t1 (the first), the amount of variation is increasing. The data is further transmitted to the communicated computer equipment, the voltage of t2 (the second) is then designated as the voltage of t1 (the first) and it returns to judge if drawing signal is still continuing at t2.

The description mentioned above is deemed the best mode that the inventor can anticipate during preparing of his invention. Any person who is skilled in the art can make changes and revisions without departing from the spirit of this invention.

What is claimed is:

1. (Amended). A touch-control computer mouse, including:
   an upper cover defining therein a touch-control space and comprising one set of press button slots;
   a casing comprising one of hanging slots for hanging of the casing and supporting stands internally disposed around an inner side wall;
   a fastening element;
   a laminated touch-control film assembly comprised, from the top to the bottom in proper sequence, of a plastic film face panel, a plate of silver coating, a y-axis resistance plane, a division layer, a x-axis resistance plane and an aluminum supporting board, said laminated touch-control film assembly being mounted on said supporting stands of said casing at the top and using a flexible ribbon line for signal output to a signal processing circuit;
   a signal processing circuit board being internally mounted in said casing and comprising a contact detector circuit coupled to said flexible ribbon line of said laminated touch-control film assembly, a power saving type constant voltage supply and ramp generator coupled to said contact detector circuit for supplying a constant voltage to said contact detector circuit, a high-low speed averager coupled to an output of said contact detector circuit, a voltage reader coupled to an output of said high-low speed averager, a single-chip microprocessor coupled to an output of said voltage reader, and a function select switch set and series input-output and power circuit each coupled to said single-chip microprocessor;
   wherein said upper cover is mounted on said casing to cover said signal processing circuit board and said laminated touch-control film assembly therein with said laminated touch-control film assembly disposed in said touch-control space of said upper cover;

characterized in that drawing on said laminated touch-control film assembly by a finger triggers to provide x-axis, y-axis reference potential to said contact detector circuit of said signal processing circuit board for processing, said signal processing circuit board further sending x-axis, y-axis coordinates corresponding to the contact signals detected and processed to a PC or communicating equipment for position display on the display screen of the monitor of the PC or communicating equipment such that computer mouse function can be achieved through said function select switch set.

2. The touch-control computer mouse according to claim 1, wherein said fastening element is attached to a PC or communicating equipment for hanging thereon of the touch-control computer mouse through said hanging slots of said casing permitting the touch-control computer mouse to be carried with a PC or communicating equipment for convenient operation everywhere in transportation vehicle or narrow space.

3. The touch-control computer mouse according to claim 1, wherein said x-axis and y-axis resistance planes comprise silver glue conductors respectively extended for deriving reference potential therefrom, said plane of silver coating being to eliminate noise and static electricity and comprising a silver glue conductor for grounding, the silver glue conductor of said x-axis and y-axis resistance planes and the silver glue conductor of said plane of silver coating being connected together through heat pressing process to form a flexible ribbon line for signal output.

4. The touch-control computer mouse according to claim 1, wherein said signal processing circuit board alternatively receives x-axis input reference potential through said contact detector circuit and informs said single-chip microprocessor of the operation of the touch-control computer mouse, said single-chip microprocessor being to control high-low speed averager and said contact circuit to alternatively switch to x-axis or y-axis through software operation, said high-low speed averager utilizing a wave form rectifier circuit to eliminate noise resulted from shaking of finger during drawing of the finger on the computer mouse and to provide said single-chip microprocessor with an acceptable wave form.

5. The touch-control computer mouse according to claim 1, wherein said power saving type constant voltage and ramp generator of said signal processing circuit board directly utilizes the power supply from a PC or communicating equipment, and comprises a transistor circuit stabilizer diode and a starting resistance forming a constant voltage source to provide a reference potential to said contact detector circuit and to charge said ramp generator.

6. The touch-control computer mouse according to claim 1, wherein said single-chip microprocessor of said signal processing circuit is to control the select switch of said voltage reader to select x-axis or y-axis reference potential and to control the switch of the capacitor of said power saving type voltage supply and ramp generator to be charged or discharge, and wherein the capacitor of said ramp generator is charged, when voltage reader selects x-axis, y-axis or any point of the reference potential, to send the potential of the selected two points to said voltage reader for comparison, until output potential controls the counter of said single-chip microprocessor to stop counting, so as to obtain corresponding coordinates for x-axis, y-axis.

7. The touch-control computer mouse according to claim 1, wherein said function select switch set of said signal processing circuit board comprises a lock key for drawing lines.

* * * * *